(12) United States Patent
Nees et al.

(10) Patent No.: US 6,622,450 B2
(45) Date of Patent: Sep. 23, 2003

(54) ROLL-FORMED AND STAMPED DOORBEAM

(75) Inventors: Rainer B. Nees, West Olive, MI (US); Melvin J. Guiles, West Olive, MI (US); David W. Heatherington, Spring Lake, MI (US)

(73) Assignee: Shape Corporation, Grand Haven, MI (US)

( * ) Notice: Subject to any disclaimer, the term of this patent is extended or adjusted under 35 U.S.C. 154(b) by 0 days.

(21) Appl. No.: 09/904,066

(22) Filed: Jul. 12, 2001

(65) Prior Publication Data

US 2002/0069609 A1 Jun. 13, 2002

Related U.S. Application Data

(60) Provisional application No. 60/217,791, filed on Jul. 12, 2000.

(51) Int. Cl.[7] ................................................ B60J 5/04
(52) U.S. Cl. .................... 52/735.1; 52/730.4; 52/731.6; 296/146.6; 296/188
(58) Field of Search ........................... 52/730.3, 730.4, 52/730.5, 731.6, 735.1; 296/146.6, 188

(56) References Cited

U.S. PATENT DOCUMENTS

| | | | | | |
|---|---|---|---|---|---|
| 4,090,734 | A | * | 5/1978 | Inami et al. ............... | 296/146.6 |
| 4,307,911 | A | * | 12/1981 | Pavlik ...................... | 296/146.6 |
| 4,684,166 | A | * | 8/1987 | Kanodia ................... | 296/146.6 |
| 4,796,946 | A | * | 1/1989 | Wilson et al. ............... | 148/333 |
| 5,404,690 | A | | 4/1995 | Hanf | |
| 5,480,189 | A | * | 1/1996 | Davies et al. ................ | 280/784 |
| 5,580,120 | A | * | 12/1996 | Nees et al. ............... | 296/146.6 |
| 5,692,797 | A | | 12/1997 | Dancasiu | |
| 5,785,376 | A | * | 7/1998 | Nees et al. ............... | 296/146.6 |
| 5,887,938 | A | * | 3/1999 | Topker et al. ........... | 296/146.6 |
| 6,096,403 | A | * | 8/2000 | Wycech .................... | 296/146.6 |

FOREIGN PATENT DOCUMENTS

| | | |
|---|---|---|
| WO | 0728607 | 8/1996 |
| WO | 9917947 | 4/1999 |

* cited by examiner

Primary Examiner—Carl D. Friedman
Assistant Examiner—Basil Katcheves
(74) Attorney, Agent, or Firm—Warner Norcross & Judd

(57) ABSTRACT

A two-piece doorbeam including a relatively low-cost, low-strength body and a relatively high-cost, high-strength insert. The insert is hat-shaped and crimped within the body. The insert provides improved impact strength where needed, providing the doorbeam the desired strength at relatively low weight and low cost.

10 Claims, 2 Drawing Sheets

ROLL-FORMED AND STAMPED DOORBEAM

PRIORITY

This application claims priority from provisional application No. 60/217,791 filed Jul. 12, 2000, and entitled "Roll-formed/Stamped Doorbeam".

BACKGROUND OF THE INVENTION

1. Field of the Invention

The present invention relates to vehicle doorbeams, and more particularly to such doorbeams with reinforcing inserts.

2. Description of the Art

Vehicle doorbeams are widely used in the automotive industry to enhance the impact strength of vehicle doors and thereby enhance automobile safety. A doorbeam typically is roll-formed from steel and includes a hat-shaped beam portion and a pair of paddles at either end of the beam portion. A doorbeam typically is secured within a vehicle door by welding the paddles to the door frame.

When considering the design of doorbeams—as well as virtually all automotive components—designers seek an appropriate balance among performance, weight, and cost. As part of that balance, it is known that the weight of a doorbeam can be decreased by manufacturing the doorbeam of a relatively expensive material. However, this undesirably increases the cost of the doorbeam. It also is known that the strength of a doorbeam can be increased by manufacturing the doorbeam from relatively thick stock. However, this undesirably increases the weight of the doorbeam.

In any effort to reduce overall weight, some designers include a reinforcing component on the hat-shaped beam. Examples of this approach are disclosed in U.S. Pat. No. 5,692,797 issued Dec. 2, 1997 to Dancasiu; U.S. Pat. No. 4,796,946 issued Jan. 10, 1989 to Wilson et al; and U.S. Pat. No. 4,684,166 issued Aug. 4, 1987 to Kanodia. In all of these designs, a relatively flat reinforcement is crimped onto a segment of the hat-shaped doorbeam. However, designers continue to seek additional improvements in the performance/weight/cost balance.

SUMMARY OF THE INVENTION

The aforementioned problems are overcome in the present application wherein a doorbeam includes a relatively high-strength, hat-shaped insert crimped into a relatively low-strength body. The assembly provides desired performance at relatively low weight and relatively low cost. In the preferred embodiment, the insert is fabricated of Martinsite; and the beam is fabricated of mild steel.

The present invention has a variety of advantages over prior techniques. First, the majority of the doorbeam is formed of a relatively inexpensive material. Second, the reinforcing insert provides the necessary impact strength only where needed, thereby decreasing the overall weight and cost of the doorbeam. Third, the beam is manufactured in a variety of lengths by changing only the length of the base member, and not necessarily the insert.

These and other objects, advantages and features of the invention will be more fully understood and appreciated by reference to the detailed description of the preferred embodiments and the drawings.

DETAILED DESCRIPTION OF THE PREFERRED EMBODIMENT

Figure 1:
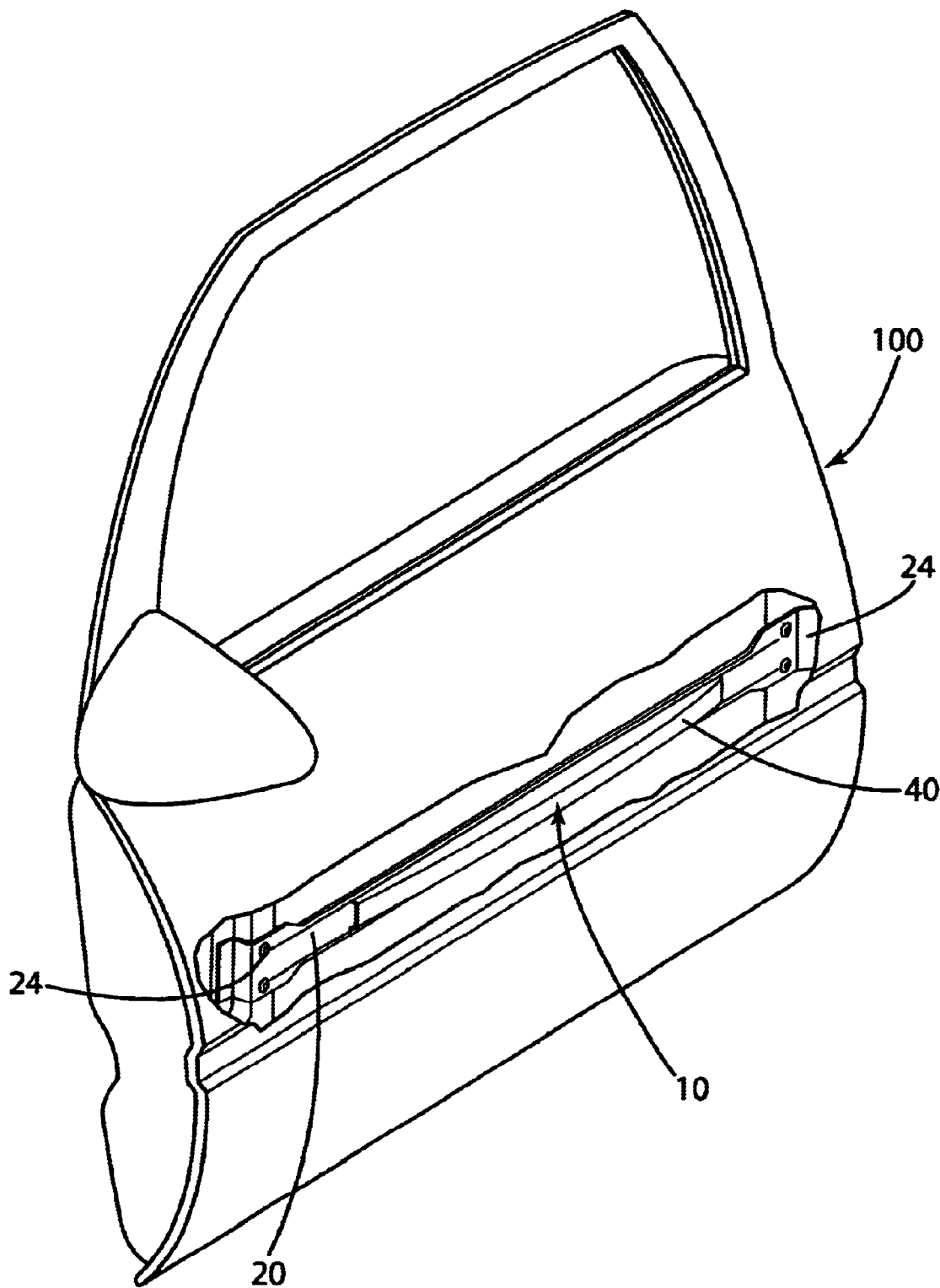
FIG. 1 is a perspective view of a vehicle door including the doorbeam of the present invention.
Figure 2:
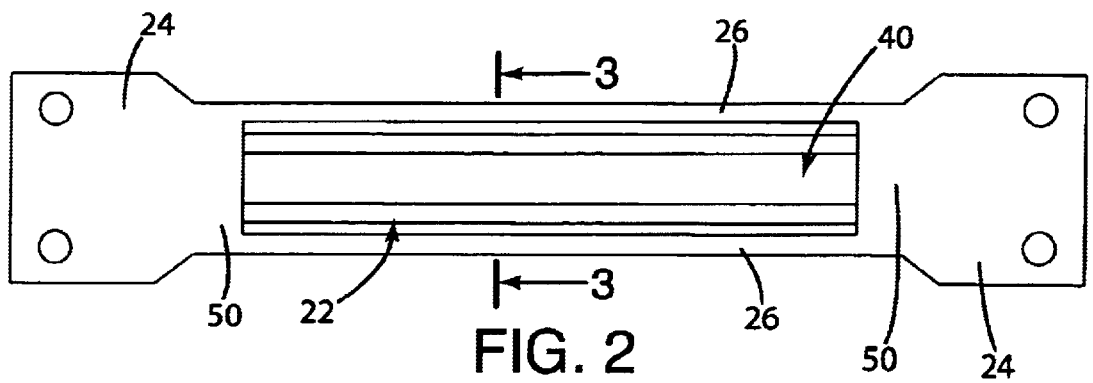
FIG. 2 is a side elevational view of the doorbeam prior to crimping of the body around the insert.

By way of disclosure, and not by way of limitation, a doorbeam constructed in accordance with a preferred embodiment of the invention is illustrated in FIGS. 1–5 and is generally designated 10.

I. Construction of the Doorbeam

The doorbeam 10 generally includes a base member or body 20 and a reinforcing member or insert 40. The base member 20 is connected to the door 100. The reinforcing member 40, crimped within the base member 20, increases the impact strength of the doorbeam 10. The reinforcing member 40 is fabricated of a material having a higher modulus of elasticity and tensile strength than the base member 20. The reinforcing member 40 has a cross section shaped to improve impact strength.

The base member 20 is a one-piece integral member including a central portion 22 and end brackets 24 at the opposite ends thereof. The impact beam 10 is oriented generally horizontally within the door 100 (FIG. 1). The end brackets 24 are secured to the frame of the door 100 by any suitable means, preferably by being welded thereto.

The configuration and shape of the end brackets 24 is well known in the art and will vary from application to application depending on the door 100. Attachment mechanisms other than, or in addition to, the brackets 24 may be included. In the preferred embodiment, the end brackets 24 are integral with the base member 20. If desired, the end brackets 24 may be fabricated separately from the central section 22 and attached to the central portion 22 by any suitable means, preferably by welding.

Figure 5:
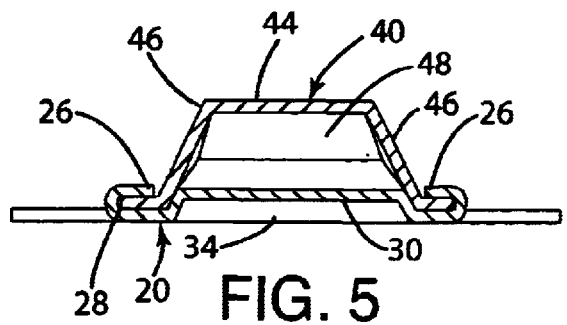
FIG. 5 is a cross section of the doorbeam taken along line 5—5 in FIG. 4.

The central portion 22 includes opposing ends 50 and lateral edges 26 that are crimped about the insert 40 in the manufactured beam. The central portion 22 further defines a longitudinal indented portion 30 to enhance its structural integrity and strength and to provide a locating function as the insert 40 is placed on the body 20 during manufacture. When crimped (see FIGS. 4–5), the lateral edges 26 are folded upon themselves to define a channel 28. The indented portion 30 is spaced from the lateral edges 26 and extends along the length of the beam 10. The indented portion 30 is shown in FIG. 5 as having a hat-shaped configuration. Alternative sections will be apparent to those skilled in the art. The indented portion 30 defines a recess 34.

The base member 20 is fabricated of a relatively low cost material having sufficient strength to remain attached to the door and support the reinforcing member during impact. In the preferred embodiment, the base member 20 is fabricated of a low cost, mild steel. The base member 20 may be fabricated of other materials.

Figure 3:
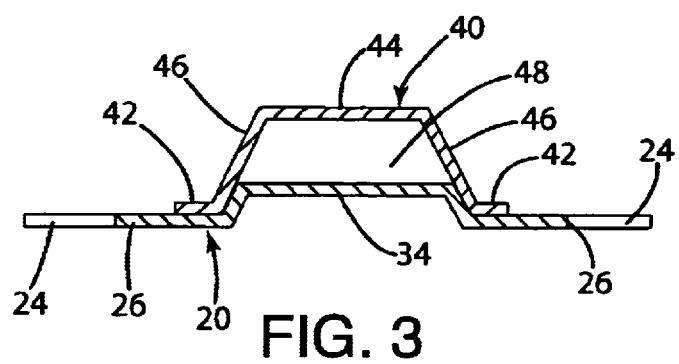
FIG. 3 is a sectional view taken along line 3—3 in FIG. 2.
Figure 4:
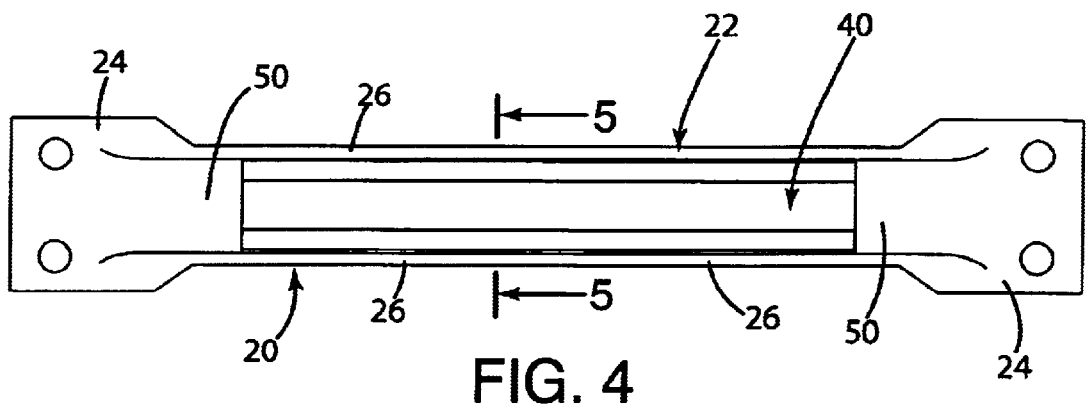
FIG. 4 is a side elevational view of the fully manufactured doorbeam showing the body crimped about the insert.

As shown in FIGS. 1, 3, and 5, the reinforcing member has a hat-shaped section throughout its length and includes feet 42, a bridge portion 44, and interconnecting side walls 46. The side walls 46 extend away from each side from the bridge portion 44. The feet 42 extend outwardly from the side walls 46 and are generally coplanar with one another. "Hat-shaped" refers to any cross section wherein a substantial strengthening body portion extends away from a pair of opposite feet. The distance between the side walls 46 is generally the same as the width of the indented portion 30 to assist in locating the insert 40 with respect to the body 20. The shape and configuration of the insert 40 will vary from application to application.

The feet 42 are secured within the channels 28 by the crimped lateral edges 26. The channels 28 allow the feet 42 of the reinforcing member 40 to slide relative to and along the length of the base member 20 during impact. The relative movement caused by this sliding helps to prevent the compressive force of an impact from bending the reinforcing member 40 and the base member 20. Therefore, the sliding of the reinforcing member 40 along the base member 20 during impact improves the impact strength of the doorbeam 10.

In the preferred embodiment, the reinforcing member 40 is positioned equidistantly from the opposite ends 50 of the base portion 20, because the maximum strength is required at the center of the beam. The length of the insert 40 and its location along the body 20 will vary from application to application.

The reinforcing member 40 is fabricated of a material having a relatively high modulus of elasticity and/or a higher tensile strength than the base member 20. In the preferred embodiment, the reinforcing member 40 is made out of a Martinsite steel. An example of an appropriate Martinsite steel is Inland M220 ultra high-strength, low-alloy steel. The Martinsite steel reinforcing member 40 has a higher modulus of elasticity than the mild steel base member 20. Because the base member 20 is fabricated of a low cost mild steel, the overall cost of the doorbeam 10 is relatively low. The reinforcing member 40 improves the impact strength of the doorbeam 10, while still enabling a relatively low overall cost.

II. Method of Manufacture

As currently contemplated, the base member 20 is stamped; and the reinforcing member 40 is roll-formed according to processes well know to those skilled in the relevant arts. The inserts 40 are roll-formed at a speed that delivers one insert to each body 20 prior to the final stamping operation in which the lateral edges 26 of the body 20 are crimped about the feet 42 of the insert 40. Just prior to the crimping operation, the reinforcing member 40 is placed on the base member 20. The mating or nesting profiles of the insert and the body facilitate the proper positioning of the insert on the body. After the insert 40 is properly positioned, the lateral edges 26 of the base member 20 are folded or crimped around the feet 42.

Welding, stamping, or lancing may be used to further secure the reinforcing member 40 to the base member 20. When used, these methods may prevent the reinforcing member 40 from sliding across the base member 20 during impact.

The end brackets 24 can be configured and shaped (to include for example angles, holes, ridges and other features) during prior, concurrent, or subsequent stamping steps.

In an alternative method of manufacture, both the base member 20 and the reinforcing member 40 are roll-formed. The roll-formed reinforcing member 40 is placed onto the roll-formed base member 20 (before the edges 26 are crimped), and the lateral edges are crimped around the feet 42 by a subsequent roll-forming operation. The end brackets 24 can be created by previous stamping operations, roll-forming operations, and/or subsequent stamping operations. The continuous beam web is then cut into individual beams The above descriptions are those of preferred embodiments of the invention. Various alterations and changes can be made without departing from the spirit and broader aspects of the invention as defined in the appended claims, which are to be interpreted in accordance with principles of patent law including the doctrine of equivalents.

The embodiments of the invention in which an exclusive property or privilege is claimed are defined as follows:

1. A vehicle doorbeam comprising:
    a one-piece body including a pair of lateral edges and a pair of opposed ends, each of said lateral edges crimped upon itself to define a groove, said grooves opening toward each other, each of said opposed ends forming an integral bracket adapted to be secured to a door, said body further including a longitudinal indented portion between said lateral edges, said indented portion including opposite side portions, said body fabricated of a body material; and
    a hat-shaped reinforcing insert including a pair of opposed leas each including a foot extending away from the other, each leg engaging one of said side portions of said indented portion, each of said feet within one of said grooves, each of said lateral edges engaging opposite surfaces of one of said feet, whereby said insert is crimped within said body, said insert shorter than said body and located between said brackets, said insert fabricated of an insert material having a higher strength than said body material.

2. The doorbeam of claim 1 wherein said insert is a Martinsite steel.

3. A doorbeam comprising:
    a hat-shaped reinforcing insert defining a channel and having a length and a pair of opposite feet extending away from one another, said insert fabricated of a relatively high strength material; and
    a one-piece body having an indented portion engagingly interfitting with said insert channel, said body further having a pair of opposite edges crimped about said opposite feet, each opposite edge engaging opposed surfaces of said respective opposite feet, said body further having a pair of opposed ends integrally formed as brackets adapted to be secured to a door, said body fabricated of a relatively low strength material, said body being longer than said insert, said brackets extending beyond the ends of said insert.

4. The doorbeam of claim 3 wherein said insert is fabricated of Martinsite steel.

5. The doorbeam of claim 3 wherein said insert is slidable within said body.

6. A method of fabricating a vehicle door beam comprising:
    forming a hat-shaped insert having lateral edges and a pair of legs each terminating in a foot, the feet extending away from one another, the legs defining a longitudinal channel between the legs;
    forming a body longer than the insert and having lateral edges, opposed ends, and an indented portion shaped to fit within the channel in the insert;
    placing said insert on the body with the channel interfitted with the indented portion, and with the insert legs engaging the indented portion, and with the insert located entirely between the lateral edges of the body;
    crimping the lateral edges of said body over the feet of the insert, whereby the crimped lateral edges form grooves opening toward each other, and further whereby each crimped lateral edge engages both opposite surfaces of the associated foot; and
    forming the opposed ends of the body into brackets integral with the body for attachment to a vehicle door.

7. The method of claim 6 wherein said insert forming step includes roll-forming.

8. The method of claim 7 wherein said step of forming a body includes stamping.

9. The method of claim 7 wherein said insert forming step includes roll-forming.

10. The method of claim 6 wherein said step of forming a hat-shaped insert includes forming the insert of Martinsite steel.

\* \* \* \* \*

UNITED STATES PATENT AND TRADEMARK OFFICE
CERTIFICATE OF CORRECTION

PATENT NO. : 6,622,450 B2
DATED : September 23, 2003
INVENTOR(S) : Rainer B. Nees et al.

It is certified that error appears in the above-identified patent and that said Letters Patent is hereby corrected as shown below:

<u>Column 4,</u>
Line 9, "leas" should be -- legs --

Signed and Sealed this

Twenty-fourth Day of February, 2004

JON W. DUDAS
*Acting Director of the United States Patent and Trademark Office*